United States Patent [19]

Kopish et al.

[11] 4,286,131

[45] Aug. 25, 1981

[54] PUSHBUTTON SWITCH ASSEMBLY

[75] Inventors: Stephen P. Kopish, Schaumburg; Richard Costantino, Rolling Meadows, both of Ill.

[73] Assignee: Motorola, Inc., Schaumburg, Ill.

[21] Appl. No.: 71,324

[22] Filed: Aug. 30, 1979

[51] Int. Cl.[3] .......................... H01H 3/12; H02B 1/02

[52] U.S. Cl. ...................................... 200/340; 200/293

[58] Field of Search .............. 200/5 A, 5 R, 5 D, 5 E, 200/159 A, 159 R, 159 B, 340, 293, 296, 314, 302; 74/483 PB, 10.1; 235/145 R

[56] References Cited

U.S. PATENT DOCUMENTS

| | | | |
|---|---|---|---|
| 2,196,667 | 4/1940 | Moseley | 200/159 R |
| 2,321,180 | 6/1943 | Bradbury | 200/60 |
| 2,814,704 | 11/1957 | Bald | 200/302 |
| 2,966,560 | 12/1960 | Gluck | 200/16 C |
| 3,182,161 | 5/1965 | Winter | 200/293 |
| 3,217,112 | 11/1965 | Campbell et al. | 200/339 |
| 3,242,298 | 3/1966 | Miller | 200/338 |
| 3,309,487 | 3/1967 | Fisher | 200/340 |
| 3,582,584 | 6/1971 | Best | 200/67 DB |
| 3,663,780 | 5/1972 | Golbeck | 200/159 R |
| 3,668,938 | 6/1972 | Dimitry | 200/302 |
| 3,674,953 | 7/1972 | Brevick | 200/77 |
| 3,716,671 | 2/1973 | Karr | 179/1 E |
| 3,866,868 | 2/1975 | Fish et al. | 403/329 |
| 3,932,722 | 1/1976 | Obata et al. | 200/340 |
| 3,939,318 | 2/1976 | Brown et al. | 200/159 R |
| 3,946,186 | 3/1976 | Howie | 200/339 |
| 3,964,593 | 6/1976 | Pointon | 200/159 B |
| 3,993,881 | 11/1976 | Marsilio | 200/339 |
| 3,997,968 | 12/1976 | Czerner et al. | 200/330 |
| 3,999,025 | 12/1976 | Sims | 200/159 B |
| 4,023,002 | 5/1977 | Wuthrich et al. | 200/302 |
| 4,072,840 | 2/1978 | Daigle | 200/296 |
| 4,132,877 | 1/1979 | Daigle | 200/296 |
| 4,136,270 | 1/1979 | Wernet et al. | 200/340 |
| 4,152,564 | 5/1979 | Wirz | 200/159 R |
| 4,190,754 | 2/1980 | Kilar | 200/329 |

OTHER PUBLICATIONS

Johnson, Keyboard and Wiping Contact Assembly, IBM Technical Disclosure Bulletin, vol. 13, No. 7, p. 1962, Dec. 1970.

*Primary Examiner*—John W. Shepperd
*Attorney, Agent, or Firm*—Phillip H. Melamed; James S. Pristelski; James W. Gillman

[57] ABSTRACT

A pushbutton switch assembly having a hand-insertable snap-in subassembly comprising the switch chassis and the switch actuator is disclosed. Dome switch electric contacts are contained within a chassis having a plastic wall with a through opening therein. The chassis has a pair of integral flexible retaining tangs projecting into the through opening. A plastic switch actuator having recesses thereon is hand-inserted into the through opening, and the flexible tangs and recesses cooperate to provide a snap-in subassembly. The flexible retaining tangs bias the actuator into a first predetermined position in which an actuating plunger on the actuator is maintained out of contact with the electrical dome switch contacts. The flexible tangs permit inward movement of the switch actuator into the opening such that the actuating plunger can contact and actuate the dome switch electrical contacts. Stop projections are provided on the switch actuator which cooperate with guide channels and end mating surfaces in the chassis wall to limit the amount of inward movement of the switch actuator while also guiding the actuator movement.

14 Claims, 3 Drawing Figures

PUSHBUTTON SWITCH ASSEMBLY

BACKGROUND OF THE INVENTION

The present invention generally relates to the field of electric switch assemblies and more specifically to pushbutton electrical switch assemblies in which the switch chassis and switch actuator form a hand-insertable snap-in subassembly.

Typically, most pushbutton switch assemblies do not have the switch actuator and switch housing forming a hand-insertable snap-in subassembly. They generally correspond to the structure of a standard doorbell pushbutton in which the switch chassis, the actuator and a separate biasing spring must act together to position the actuator in its proper location. This requires a relatively complex assembly technique when a plurality of such pushbutton assemblies are to be assembled to one common switch housing.

In some prior art switch assemblies (e.g. U.S. Pat. No. 3,582,584) the moveable manual actuator and the switch housing do form a hand-insertable snap-in subassembly. The use of these prior art subassemblies has not substantially reduced the complexity of assembling a number of switches to a common housing since these prior art switches still have required separate additional biasing structure for providing a predetermined bias to the manual actuator as well as requiring stop mechanisms to limit the amount of movement of the manual actuator.

SUMMARY OF THE INVENTION

An object of the present invention is to provide an improved electrical switch assembly which overcomes the aforementioned deficiencies.

A more particular object of the present invention is to provide an electrical switch assembly having a snap-in hand-insertable subassembly comprising the switch actuator and housing, and which does not require separate biasing means for the switch actuator or separate stop mechanisms to limit the movement of the switch actuator.

In one embodiment of the present invention an electrical switch assembly is provided. The switch assembly comprises a chassis means for housing the electrical contacts of a switch, said chassis having a wall with at least one through opening therein; switch actuator means mounted in said chassis wall opening, said switch actuator being attached to said chassis by flexible retaining means fixed to one of said chassis wall and said switch actuator means and cooperating with the other of said chassis wall and said switch actuator means to form a hand-insertable snap-in subassembly, said flexible retaining means, besides attaching said switch actuator means to said chassis, also biasing said switch actuator means into a first predetermined position with respect to said chassis wall and permitting movement of said actuator means into a second predetermined position with respect to said wall while keeping said actuator means attached to said chassis; and electrical contact means mounted inside said chassis, said actuator means selectively altering the electrical characteristics produced by said contact means in response to said actuator means moving from said first to second positions.

Basically, a pushbutton electrical switch assembly is provided in which the moveable manual actuator is mounted in an opening in a plastic chassis. The manual actuator is held in position in the chassis opening by flexible retaining tangs which are integral with the chassis and co-act with recesses in the manual actuator to form a hand-insertable snap-in subassembly comprising the actuator and chassis. Electrical contacts are mounted inside the chassis and the actuator means selectively alters the electrical characteristics produced by the electrical contacts in response to the movement of an actuating plunger on the manual actuator. The flexible retaining tangs, besides forming the snap-in subassembly of the manual actuator and chassis, also provide for biasing the actuator into a first position with respect to the chassis and electrical contacts while permitting the movement of the actuator into a second position that produces a different electrical characteristic for the contacts while maintaining the actuator attached to the chassis. By the dual use of the flexible retaining tangs to provide captivation of the manual actuator as well as biasing of the manual actuator, a vastly improved and simplified electrical switch assembly is provided.

It is also contemplated that the manual actuator or chassis has a pair of stop projections which will co-act with mating surfaces on the chassis or actuator, respectively, to limit the inward movement of the manual actuator. Also guide channels cooperate with the stop projections to guide the manual actuator in its movement between its first and second positions.

Preferably, the flexible retaining tangs are integral with a plastic chassis wall having the through opening and the tangs extend into the through opening. Also the stop projections are integral with the actuator which is also a plastic part.

BRIEF DESCRIPTION OF THE DRAWINGS

For a more complete understanding of the invention, reference should be made to the drawings, in which.

DESCRIPTION OF THE PREFERRED EMBODIMENT

Figure 1:
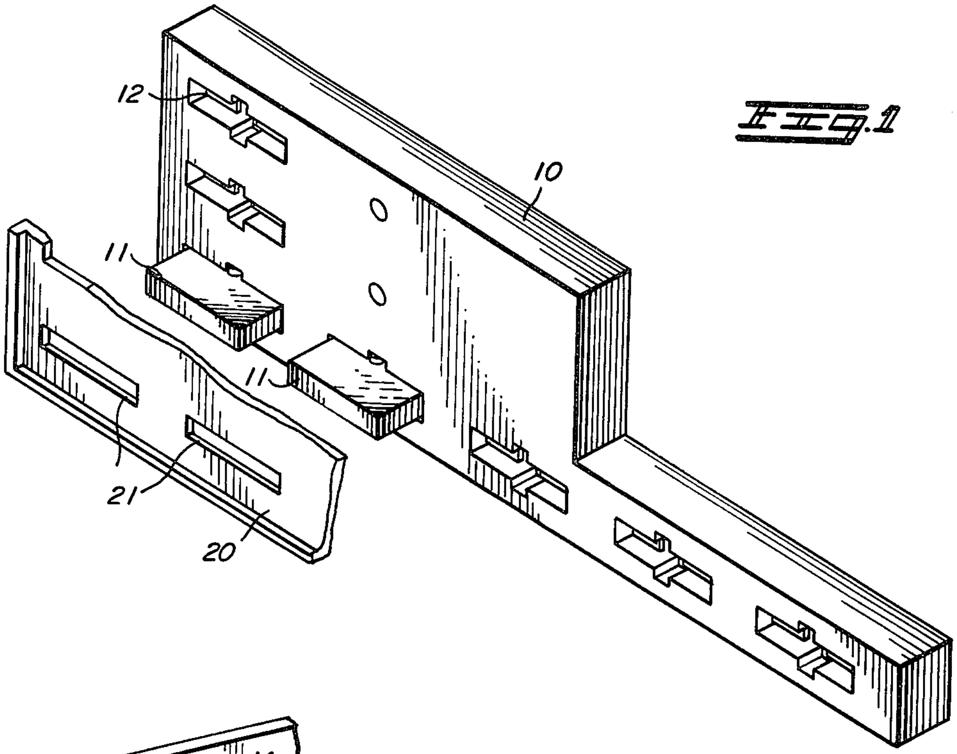
FIG. 1 is a perspective view illustrating a switch chassis capable of mounting a plurality of independent manual actuators for switch assemblies, and having a number of manual actuators already assembled thereto.

FIG 1 illustrates a molded plastic chassis wall 10 which is intended to house the electrical contacts for at least seven pushbutton assemblies having seven independently actuatable pushbutton manual actuators 11. The manual actuators 11 are also preferably formed from a molded plastic. Each manual actuator 11 is intended for insertion into a through opening 12 in the chassis wall 10. While a portion of the manual actuator 11 is intended to protrude from the front side of the chassis wall 10 as viewed in FIG. 1, behind the chassis wall in association with each manual actuator 11 it is contemplated that electrical contact means 14, preferably comprising known dome switch construction, is located behind the chassis wall 10 for actuation by an actuating plunger 13 of each manual actuator 11.

Figure 2:
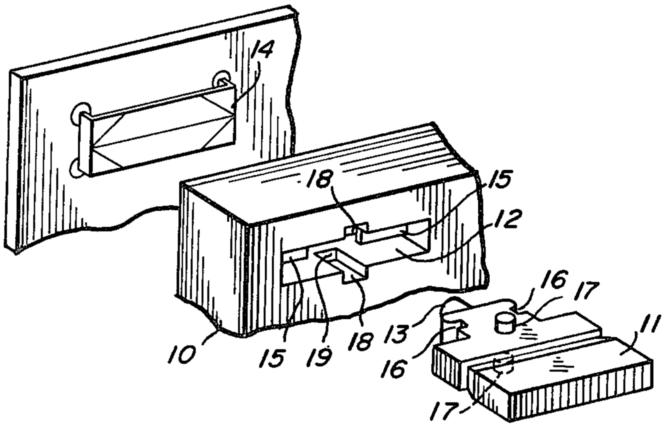
FIG. 2 is an enlarged exploded perspective view illustrating the details of one of the switch assemblies shown in FIG. 1.
Figure 3:
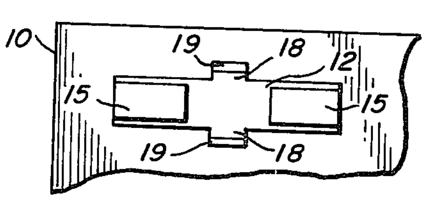
FIG. 3 is a plane view of a portion of the switch chassis shown in FIGS. 1 and 2.

FIG. 2 illustrates in exploded form the preferred construction of one of the plurality of switch assemblies illustrated in FIG. 1. FIG. 3 is a front plane view of the portion of the chassis wall 10 illustrated in FIG. 2. Identical reference numbers are utilized in FIGS. 1, 2 and 3 to refer to identical components, and the following description refers to the electrical assembly shown in the Figures.

The plastic chassis wall 10 has a pair of integral, thin, flexible retaining tangs 15 which extend into the opening 12 and are intended for cooperation with a pair of recesses 16 on the manual actuator 11. The flexible tangs 15 and recesses 16 create a hand-insertable snap-in subassembly comprising the manual actuator 11 and the chassis wall 10 since the tangs 15 will captivate the actuator 11 thereby maintaining the actuator 11 joined to the chassis wall 10. The flexible retaining tangs 15 also provide a predetermined bias which biases the manual actuator 11 into a first predetermined position with respect to the chassis wall, and therefore also with respect to the dome switch electrical contacts 14 that are positioned fixed with respect to the chassis wall. The flexible retaining arms 15 permit inward insertion movement of the manual actuator 11 while keeping the actuator attached to the chassis such that the actuator is able to move into a second inserted predetermined position with respect to the chassis wall 10. In this second inserted position the actuating plunger 13 will contact the dome switch electrical contacts 14 to alter the electrical characteristics produced by the dome switch electrical contacts. In the first position the plunger 13 does not contact the dome switch contact 14. In this manner, the flexible retaining arms 15 not only form a snap-in assembly which joins the manual actuator 11 to the housing wall 10, but also form a biasing structure which biases the manual actuator into a predetermined position with respect to the wall 10. Therefore the present assembly does not require the use of an independent bias spring for positioning the manual actuator 11 and the present invention also obtains the benefits of having a hand-insertable snap-in assembly between the manual actuator 11 and the chassis wall 10.

The manual actuator 11 also has a pair of oppositely directed integral stop projections 17 which are received in guide channels 18 in the housing wall 10 which are adjacent to the opening 12. These guide channels 18 and the stop projections 17 guide the manual actuator 11 during inward and outward movement of the actuator between its first and second positions with respect to the chassis wall 10. At the inner end of the guide channels 18 there are mating stop surfaces 19 which are integral with the chassis wall 10. These mating stop surfaces of the chassis wall cooperate with the stop projections 17 on the manual actuator to limit the amount of inward manual movement permitted by the manual actuator 11. This prevents the over-insertion of the manual actuator 11 into the housing wall 10 and therefore prevents damage to the dome switch electrical contacts 14 which could be caused by applying excessive force during unrestricted inward movement of the actuator 11. Thus the stop projections 17 which cooperate with the guide channels 18 and the mating stop surfaces 19 not only limit the amount of inward movement of the manual actuator 11 but also serve as guides for the inward and outward movement of the manual actuator 11.

In FIG. 1 a front nosepiece bezel 20 is shown which is intended to fit over the subassemblies comprising the manual actuators 11 and chassis wall 10. The bezel 20 has slots 21 through which manually accessable portions of the manual actuators 11 protrude, but which are too narrow to permit passage of the stop projections 17. Thus the bezel 20 in cooperation with the stop projections 17 prevent removal of the manual actuators 11 from the chassis wall after the bezel has been fit over the subassemblies comprising the actuators 11 and chassis wall 10. This is because the bezel defines a second limit position for the actuators 11 while the chassis wall stop surfaces 19 define a first limit position for the actuators 11.

While we have shown and described a specific embodiment of this invention, further modifications and improvements will occur to those skilled in the art. One such modification would be to reverse the elements disclosed herein such that the flexible tangs would lie on the manual actuator 11 which would also contain the guide channels 18 and mating stop surfaces 19, while the recesses 16 for receiving the flexible tangs would now be contained in the chassis wall 10 which would also contain a pair of inwardly extending stop projections to cooperate with the guide channels and mating stop surfaces on the actuator 11. All such modifications which retain the basic underlying principles disclosed and claimed herein are within the scope of this invention.

We claim:

1. An electrical switch assembly, comprising:

chassis means for housing the electrical contacts of a switch, said chassis having a wall with at least one through opening therein;

at least one switch actuator means mounted in said chassis wall opening, said switch actuator being attached to said chassis by flexible retaining means fixed to one of said chassis wall and said switch actuator means and having at least one flexible extending portion cooperating with a recess in the other of said chassis wall and said switch actuator means to form a hand-insertable snap-in subassembly, said flexible retaining means, besides attaching said switch actuator means to said chassis, also biasing said switch actuator means into a first predetermined position with respect to said chassis wall and permitting movement of said actuator means into a second predetermined position with respect to said wall while keeping said actuator means attached to said chassis; and electrical contact means mounted inside said chassis, said actuator means selectively altering the electrical characteristics produced by said contact means in response to said actuator means moving from said first to second positions.

2. An electrical switch assembly according to claim 1 wherein said actuator means has at least one stop projection thereon and wherein said assembly includes bezel means fitting over said snap-in subassembly with a portion of said switch actuator means protruding through a slot in said bezel means, said slot being too narrow to pass said stop projection, wherein said bezel means and said stop projection cooperate to prevent removal of said switch actuator means from said chassis wall after said bezel means is fit over said snap-in assembly.

3. An electrical switch assembly according to claim 1 wherein said flexible retaining means comprise at least a pair of flexible tangs which cooperate with said recesses to provide the hand-insertable snap-in subassembly.

4. An electrical switch assembly according to claim 3 wherein said flexible retaining means, including said flexible tangs, are mounted on said chassis wall and said recesses are contained on said switch actuator means.

5. An electrical switch assembly according to claim 4 wherein said flexible tangs project into said chassis wall opening to cooperate with said recesses on said switch actuator means when said switch actuator means is inserted into said wall opening to form the hand-insertable snap-in subassembly.

6. An electrical switch assembly according to any of claims 1, 3, 4 and 5 wherein said flexible retaining means are integral with said one of said chassis wall and switch actuator means which said flexible retaining means are fixed to.

7. An electrical switch assembly according to claim 6 wherein said integral flexible retaining means and said one of said chassis wall and switch actuator means on which said flexible retaining means are fixed to are formed from molded plastic.

8. An electrical switch assembly according to any of claims 1, 3, 4 and 5 in which said switch actuator means is a pushbutton actuator mounted for relative movement in and out with respect to said chassis wall opening.

9. An electrical switch assembly comprising:

chassis means for housing the electrical contacts of a switch, said chassis having a wall with at least one through opening therein;

at least one switch actuator means mounted in said chassis wall opening, said switch actuator being attached to said chassis by flexible retaining means fixed to one of said chassis wall and said switch actuator means and having at least one flexible extending portion cooperating with a recess in the other of said chassis wall and said switch actuator means to form a hand-insertable snap-in subassembly, said flexible retaining means, besides attaching said switch actuator means to said chassis, also biasing said switch actuator means into a first predetermined position with respect to said chassis wall and permitting movement of said actuator means into a second predetermined position with respect to said wall while keeping said actuator means attached to said chassis; and electrical contact means mounted inside said chassis, said actuator means selectively altering the electrical characteristics produced by said contact means in response to said actuator means moving from said first to second positions, wherein one of said chassis wall and actuator means has at least one stop projection which cooperates with a mating stop surface on the other one of said chassis wall and actuator means to prevent movement of said actuator means beyond a predetermined limit position with respect to said wall while said actuator means is attached to said wall by said flexible retaining means.

10. An electrical switch assembly according to claim 9 wherein said mating stop surface is located at the end of a guide channel that cooperates with said stop projection for guiding the movement of said switch actuator means in said chassis wall opening.

11. An electrical switch assembly according to claim 10 wherein said stop projection is located on said switch actuator means and said guide channel and mating stop surface are located on said chassis wall.

12. An electrical switch assembly according to any of claims 9–11 which includes a pair of said stop projections projecting in opposite directions each cooperating with a different mating stop surface for limiting the amount of movement of said switch actuator means.

13. An electrical switch assembly according to any of claims 9 through 11 which includes bezel means fitting over said snap-in subassembly comprising said switch actuator means and chassis wall, said bezel means having a slot therein through which a portion of said switch actuator means protrudes, said bezel means cooperating with said chassis wall and switch actuator means to captivate said switch actuator means by limiting the movement of said actuator means between said first limit position and a second limit position.

14. An electrical switch assembly according to claim 9 wherein said stop projection is located on said switch actuator means, said assembly including bezel means fitting over said snap-in subassembly with a portion of said switch actuator means protruding through a slot in said bezel means, said slot being too narrow to pass said stop projection wherein said bezel means and said stop projection cooperate to prevent removal of said switch actuator means.

* * * * *